W. H. SCOTT.
GATE VALVE.
APPLICATION FILED FEB. 13, 1912.
1,037,338.
Patented Sept. 3, 1912.
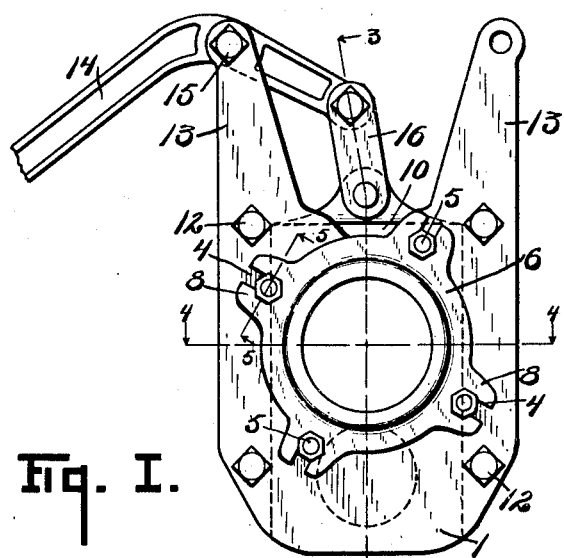
Fig. I.
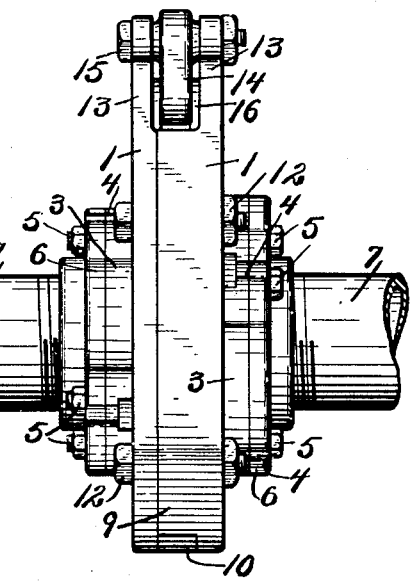
Fig. II.
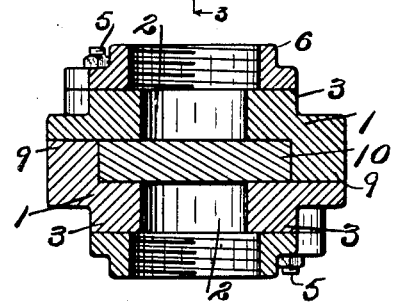
Fig. IV.
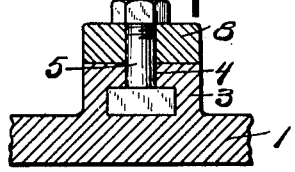
Fig. V.
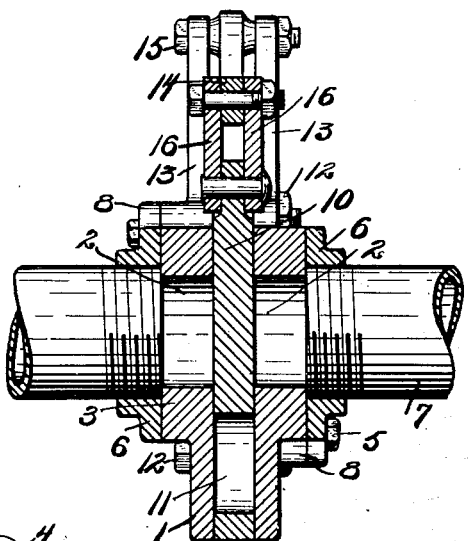
Fig. III.
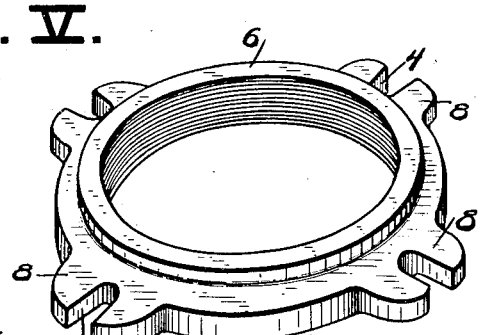
Fig. VI.
Witnesses
M. L. Glasgow.
M. O. Woodruff.
Inventor
William H. Scott
By Chappell & Earl
Attorneys

UNITED STATES PATENT OFFICE.

WILLIAM H. SCOTT, OF KALAMAZOO, MICHIGAN.

GATE-VALVE.

1,037,338.  Specification of Letters Patent.  Patented Sept. 3, 1912.

Application filed February 13, 1912. Serial No. 677,297.

*To all whom it may concern:*

Be it known that I, WILLIAM H. SCOTT, a citizen of the United States, residing at the city of Kalamazoo, county of Kalamazoo, State of Michigan, have invented certain new and useful Improvements in Gate-Valves, of which the following is a specification.

This invention relates to improvements in gate valves.

The main objects of this invention are: First, to provide an improved gate valve which is well adapted for embodiment in large sizes, and for controlling materials such as paper stock or pulp, and which is not likely to become clogged while controlling such material. Second, to provide an improved gate valve which may be easily installed in systems of piping already in place. Third, to provide an improved gate valve which is simple and economical in structure and one which is durable and not likely to get out of repair.

Further objects, and objects relating to structural details will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of my improved valve, a portion of the lever being broken away. Fig. II is an edge view thereof, the valve being shown in connection with a conduit or pipe. Fig. III is a detail vertical section taken on a line corresponding to the broken line 3—3 of Fig. I. Fig. IV is a horizontal section taken on a line corresponding to line 4—4 of Fig. I. Fig. V is a detail section taken on a line corresponding to line 5—5 of Fig. I, showing the means of attachment for the coupling members 6 to the valve casing. Fig. VI is a perspective view of one of the pipe coupling members.

In the drawing, similar reference characters refer to similar parts throughout the several views and the sectional views are taken looking in the direction of the little arrows at the ends of the section lines.

Referring to the drawing, the casing of my improved valve consists of a pair of plate-like casing members 1 having ports 2 therein, the ports being surrounded by annular flanges 3. These flanges are provided with radial slots 4 adapted to receive the heads of the bolts 5 for attaching the pipe couplings 6. The pipe couplings 6 are threaded to engage the pipe 7, and are clamped to the flanges 3 by the bolts 5. The pipe couplings 6 are provided with slotted ears 8, adapted to receive these bolts when the bolts are presented sidewise thereto.

The valve casing members 1 are provided with flanges 9 on their inner faces, each plate having one flange, the flanges of the two plates being disposed diagonally opposite so that the plates are spaced to provide a slide-way for the plate-like valve 10. The valve 10 is provided with a port 11, adapted to be brought into register with the ports 2 of the valve casing. By thus forming the casing members 3, they may be made duplicates and are brought face to face, as clearly shown. The coupling members 6 are also duplicates.

The casing members 1 are secured together by clamping bolts 12. Each casing member is provided with a pair of upwardly-projecting arms 13, on which the lever 14 is mounted by the pivot 15. The lever is adapted to be mounted on either side of the valve casing. This permits its being arranged to be operated from the right or the left hand side, as desired. The inner end of the lever 14 is connected to the valve by the link 16.

By arranging the coupling and attaching members as described, the valve can be inserted in a system already in place, as the coupling 6 can be screwed upon the pipe and then attached to the valve casing, the valve casing being slipped between the couplings. The valve casing is preferably open at the bottom, so that it is self clearing.

While my improved valve is mainly designed by me for the control of paper stock conduits and large conduits, it is desirable for use in various relations where gate valves are adapted or desired.

I have illustrated and described my improved gate valve in detail in the form in which I have embodied it for use. I am aware, however, that it is capable of considerable structural variations in details without departing from my invention, and I have made certain modifications, such as screw for actuating the valve instead of the lever connections. As such modifications will no doubt be readily understood by those skilled in the art to which this invention relates, I have not attempted to illustrate or describe the same herein.

Having thus described my invention, what I claim as new and desire to secure by Letters Patent is:—

1. In a gate valve, the combination of the casing comprising a pair of plate-like casing members having port openings therein and attaching flanges surrounding said port openings, said attaching flanges being slotted to receive bolt heads presented sidewise thereto, each of said casing members being provided with a flange on its inner face, said flanges being disposed diagonally opposite and parallel to provide a slide-way open at the top and bottom, said casing members being provided with pairs of projecting lever supporting arms at one end; clamping bolts for said casing members; a plate-like valve arranged in said slide-way and having a port therein adapted to be brought into and out of register with said port openings of said casing members; a lever pivotally mounted on one pair of arms on said casing members; a link connecting said lever to said valve; pipe coupling members having slots therein; and attaching bolts for said coupling members adapted to be engaged in said bolt slots of said casing member attaching flanges.

2. In a gate valve, the combination of the casing comprising a pair of plate-like casing members having port openings therein and attaching flanges surrounding said port openings, said attaching flanges being slotted to receive bolt heads presented sidewise thereto, each of said casing members being provided with a flange on its inner face, said flanges being disposed diagonally opposite and parallel to provide a slide-way open at the top and bottom; clamping bolts for said casing members; a plate-like valve arranged in said slide-way and having a port therein adapted to be brought into and out of register with said port openings of said casing members; pipe coupling members having slots therein; and attaching bolts for said coupling members adapted to be engaged in said bolt slots of said casing member attaching flanges.

3. In a gate valve, the combination of the casing comprising a pair of plate-like casing members having port openings therein and attaching flanges surrounding said port openings, said attaching flanges being slotted to receive bolt heads presented sidewise thereto, said casing members being provided with pairs of projecting lever supporting arms at one end; clamping bolts for said casing members; a plate-like valve; a lever pivotally mounted on one pair of arms on said casing members; a link connecting said lever to said valve; pipe coupling members having slots therein; and attaching bolts for said coupling members adapted to be engaged in said bolt slots of said casing member attaching flanges.

4. In a gate valve, the combination of the casing comprising a pair of plate-like casing members having port openings therein and attaching flanges surrounding said port openings, said attaching flanges being slotted to receive bolt heads presented sidewise thereto; clamping bolts for said casing members; a plate-like valve; pipe coupling members having slots therein; and attaching bolts for said coupling members adapted to be engaged in said bolt slots of said casing member attaching flanges.

5. In a gate valve, the combination of the casing comprising a pair of plate-like casing members having port openings therein, each of said casing members being provided with a flange on its inner face, said flanges being disposed diagonally opposite and parallel to provide a slide-way open at the top and bottom, said casing members being provided with pairs of projecting lever supporting arms at one end; clamping bolts for said casing members; a plate-like valve arranged in said slide-way and having a port therein adapted to be brought into and out of register with said port openings of said casing members; a lever pivotally mounted on one pair of arms on said casing members; and a link connecting said lever to said valve.

6. In a gate valve, the combination of the casing comprising a pair of substantially duplicate plate-like casing members having port openings therein, each of said casing members being provided with a flange on its inner face, said flanges being disposed diagonally opposite and parallel to provide a slide-way when the pair of plates are brought face to face; clamping bolts for said casing members; a plate-like valve arranged in said slide-way; and means for operating said valve.

In witness whereof I have hereunto set my hand and seal in the presence of two witnesses.

WILLIAM H. SCOTT. [L. S.]

Witnesses:
LUELLA GREENFIELD,
MARGARET GLASGOW.